United States Patent
Friedman

[11] 3,902,273
[45] Sept. 2, 1975

[54] TREATMENTS OF VEGETABLE MATTER

[76] Inventor: Stephen A. Friedman, 28 Chapman Dr., Ontario, N.Y. 14519

[22] Filed: Jan. 15, 1970

[21] Appl. No.: 3,039

[52] U.S. Cl. .................. 47/58; 47/1.3; 47/DIG. 12
[51] Int. Cl. ............................................. A01g 7/00
[58] Field of Search................ 47/1.3, DIG. 12, 58; 172/40

[56] References Cited
UNITED STATES PATENTS
3,307,289  3/1967  Lemm............................... 47/1.3 X
3,499,436  3/1970  Balamuth......................... 47/1.3 X FOREIGN PATENTS OR APPLICATIONS
740,764  10/1943  Germany...................... 47/DIG. 12
880,525  6/1953  Germany...................... 47/DIG. 12

OTHER PUBLICATIONS
Seeds, Yearbook of Agriculture, 1961, U.S. Dept. of Agriculture, p. 7 relied on.

The Use of Ultrasonic Energy in Agriculture, Campbell et al., Agric. Engineering, May 1949, p. 240 relied on.

Primary Examiner—Robert E. Bagwill
Attorney, Agent, or Firm—Denson and Kurtzman

[57] ABSTRACT

Desirable effects are produced in various different types of vegetable matter by subjecting the same to the effect of cavitation produced by ultrasonic sound waves while the vegetable matter is saturated with an aqueous medium. The germination of seeds is inhibited. The sprouting of potatoes, onions, wild rose stalks, etc. is inhibited. The cytoplasmic membrane structure of algae is ruptured. Tea, coffee and the like are extracted. Potted plants are treated to kill weeds. Apparatus is disclosed.

12 Claims, 3 Drawing Figures

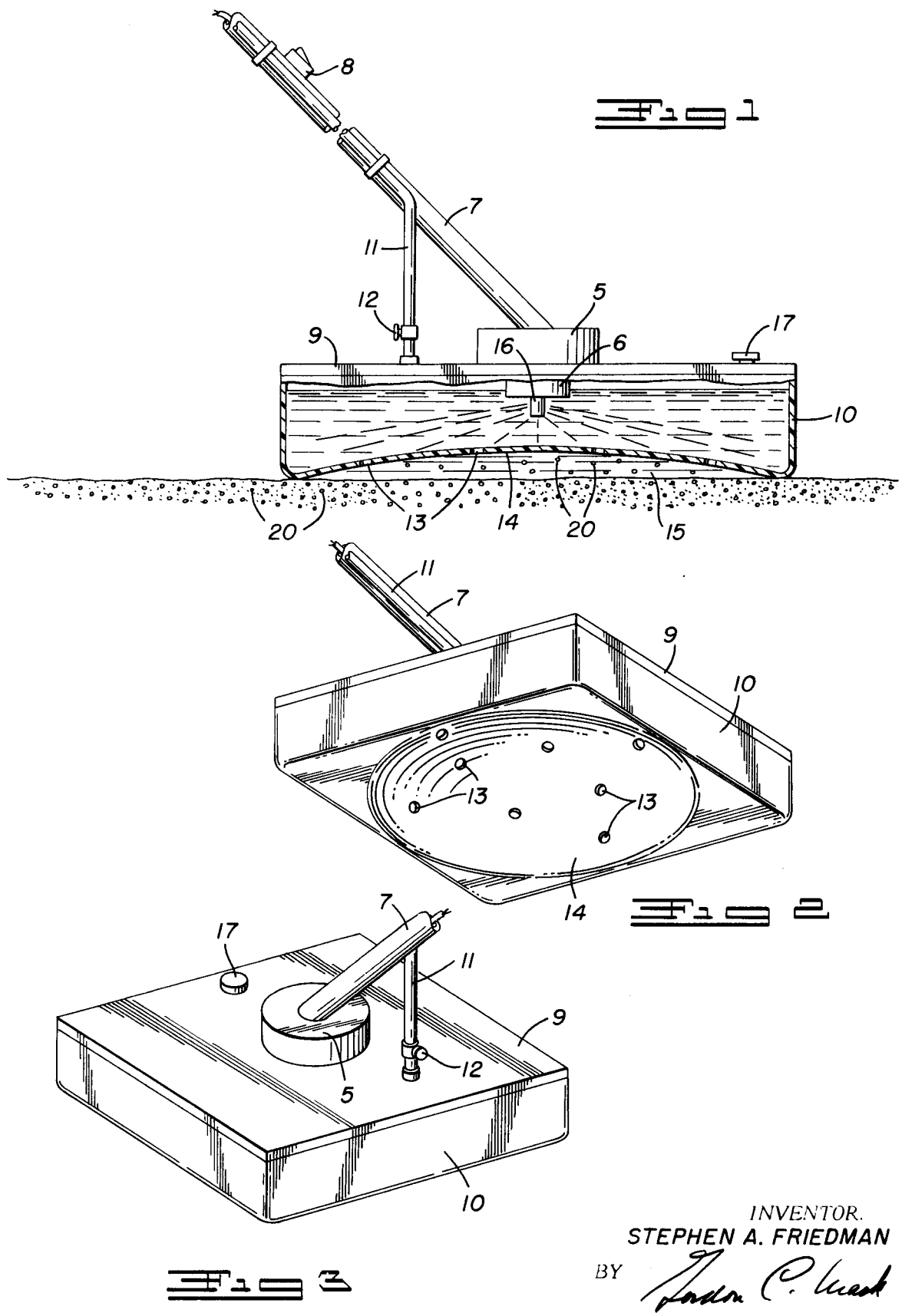

TREATMENTS OF VEGETABLE MATTER

This invention relates to the treatment of vegetable matter in an aqueous medium, by cavitation in the medium produced by ultrasonic (supersonic) sound waves. Apparatus useful in the treatment is included.

One important application of the invention is the inhibition of the germination of seeds, more particularly the seeds of weeds, in a growing medium such as soil or sand or vermiculite, etc., saturated with an aqueous medium, usually water, although other aqueous media may be used, such as water solutions or suspensions of soil nutrients, etc.

Ultrasonic sound waves have been used for the destruction of animal life in various forms, but the cavitation effect on vegetable matter has not been studied so far as is known, and this invention is limited in that respect.

INHIBITION OF GERMINATION OF SEEDS

The invention includes the inhibition of the germination of seeds, particularly weed seeds, and apparatus therefor.

The word "weed" is used herein to refer to any undesirable plant. What is undesirable in a cornfield may be desirable elsewhere. Thus, what is a weed in one situation need not necessarily be a weed in another situation.

Until the recent advent of chemicals for the destruction of weed growth, civilized man had progressed very little in the area of weed control. The elimination of weeds had been accomplished by pulling the weeds out of the soil, sometimes manually and sometimes by tilling, and this was done to insure a harvest in competition with weed growth. That same procedure is still practiced by at least 95 per cent of the world food and horticultural producers.

From time immemorial, civilized man has competed with nature in the struggle to produce agricultural and horticultural crops. The natural existence of weed seeds is common to all soils of the world and it would be impossible to estimate the amount of soil nutrients and moisture lost to weed plants while in competition with the needed agricultural and horticultural plants.

With the ever increasing world population, an ever increasing supply of agricultural and horticultural crops is demanded. Every program to increase the harvest or to preserve natural beauty is very much needed. The elimination of competition from weed growth would certainly increase any harvest and increase the productivity of our horticultural plants by making available to the needed plants additional soil nutrients and moisture.

According to the present invention the germination of weed seeds is inhibited by subjecting them to ultrasonic sound cavitation on or means the surface of saturated soil or other growing medium. This may take place before sowing the crop seed or at any time after the crop seed has been sowed, and even after plants have developed. The growing medium, which will generally be referred to herein as soil, may be soil or sand or vermiculite or other medium used in the growing processes of agriculture and horticulture. The process is applicable to the treatment of turf areas, including lawns, golf greens, etc., and to the treatment of flower beds and vegetable growing areas, both small and large, including wheat, corn and tobacco fields, etc. The treatment is readily applied in greenhouses and the like.

To prevent weed seed germination, it is necessary that the soil be saturated with an aqueous medium, usually water, so that when ultrasonic sound waves are applied thereto there is a cavitation effect which inhibits the weed seed germination. Thus the apparatus employed may include means for supplying water to the soil as well as means for producing the cavitation effect, although the water may be previously applied. The apparatus will normally include a generator and ultrasonic transducer, and usually also a chamber to contain the water in which the sound waves generated produce a cavitation effect. Alternatively, the apparatus may produce the cavitation effect directly in water with which the soil is saturated.

If the apparatus includes a chamber, it may have a flat bottom which contacts the moist ground areas and transmits the cavitation effect thereto, but preferably the bottom is concave and the space between the bottom and the soil will be filled with water which transmits the cavitation effect to the soil. Alternatively, a transducer may operate directly on a plate member (not a part of a chamber) which when brought into contact with the saturated soil, generates the cavitation effect directly therein.

Such apparatus will generally be fashioned in such a manner that it can be easily pushed over the surface of the ground. Alternatively, it may comprise a roller containing the aqueous medium with a transducer within the roller to produce the cavitation effect on the aqueous medium. The aqueous medium may or may not fill the roller.

Regardless of the type of apparatus employed, unless the soil is first saturated with the aqueous medium, the apparatus must comprise means to supply the aqueous medium which will generally pass through a chamber in the apparatus, whether or not the apparatus be a roller. The bottom of the chamber is perforated to supply water to the ground and if the bottom of the apparatus is concave, the supply of water will be sufficient to fill the space between the bottom and the ground.

Although generally the treatment will be applied to seed after it is sown, and to seed which has sown itself, the supplier of seed may treat it in a vessel containing water, before marketing it.

It has been known that for the destruction of animal life, not using the cavitation method, very high transducer frequencies are required. For the inhibition of the germination of weed seeds using the cavitation method, lower frequencies in the range of 20,000 to 40,000 cycles per second are used. The apparatus may be equipped with regulators to vary the frequency cycles. The frequency which is found preferred for the treatment of any particular seed will depend upon the type of seed, the moisture content of the soil, the soil content (i.e., whether it is sandy, clay, loam, etc.) and the time of treatment. Thus, if the frequency is fixed at any figure between about 20,000 and about 40,000, a treatment of about 3 to 120 seconds will be required to effectively inhibit the germination of weed seeds. The higher the frequency between 20,000 and 40,000 cycles, the less the time required.

For complete elimination of weed seeds, a repetition of the treatment one or more times may be desirable. Seed in which germination has not started generally requires more severe treatment than seed which has started to germinate.

Thus, the effect of the treatment on rye grass seed submerged in water seems to be directly related to the extent that the seed has germinated. For instance, 80 to 100 per cent of such seed that has commenced the germination cycle to the point where there is some growth from the seed germ, is killed by a treatment of 10 to 15 seconds using cavitation produced by a vibration of 40,000 cycles per second; and a repetition of this treatment after about three to five days kills all (at least substantially all), of the seeds. Compared to this, seed which has not commenced the germination cycle, takes two or three treatments of 60 to 90 seconds, spaced about three to five days apart, to kill all, or substantially all, of the seed.

The invention as applied to the inhibition of weed seeds is further described in connection with the accompanying drawings, in which FIG. 1 is an elevation of one type of apparatus which may be used, resting on the soil;

FIG. 2 is a bottom view of the same; and

FIG. 3 is a top view.

The generator 5 is any generator suitable for use with a transducer, of which there are various types on the market. It supplies the necessary energy to the ultrasonic transducer 6 to produce sound waves in the range of 20,000 to 40,000 cycles per second. There are many suitable transducers on the market, including sirens, etc. The apparatus is moved so as to subject any covered area to the treatment for 3 to 120 seconds, for example.

Wires to convey power to the generator are concealed in the handle 7. Regulator 8 may be provided to control the current supplied to the generator and vary the frequency of the sound waves generated by the transducer 6. The top plate 9 serves as means to support the generator 5 and transducer 6, and also serves as the top of the chamber 10.

Water is supplied to the chamber 10 through the line 11, which is shown as being fastened to the handle 7 and diverted from the handle to an opening in the top plate. The valve 12 regulates the flow of water. It is regulated to provide the desired flow of water through the chamber 10 and out through the holes 13 in the concave bottom 14. Thus there is a continuous supply of water into the space 15 between the soil and the concave bottom 13. It is not necessary that the chamber 10 be filled, but ordinarily it will at least cover the transducer tip 16.

The top plate is advantageously provided with a relief valve 17 to relieve the air pressure if and when necessary as, for example, when, at the start of an operation, the chamber is being filled with water. It may be closed to maintain any desired water level. It may be an automatic valve which is normally closed but which is opened under air pressure.

For equipment to be used around the home, the power supply will usually be the house current. A gasoline-powered electric generator may be used on an estate or farm.

The apparatus shown may be modified to be pushed or pulled by a tractor or any other vehicular device or it may be embodied in a tractor for large scale operations in which case the power may be generated by the tractor itself. Any suitable means for generating the ultrasonic sound may be employed. Water may be supplied from any suitable source. It may be supplied from a container on the equipment or it may be conveyed to the equipment. If the chamber 10 is eliminated, the water may be supplied directly to the soil without going through the equipment.

The chamber 10 may be molded or otherwise formed. It may be constructed of a molded plastic, Pyrex or other glass, stainless steel, or any other non-corrosible suitable material.

The concave surface serves the following purposes:

a. It acts to focus the cavitation effect into a reduced area for best results;

b. It forms the bottom of chamber 10;

c. It traps any seeds on or near the surface of the soil which float in water inside the space 15 where they are irradiated by ultrasonic sound cavitation; and d. It acts to permit a floating effect for the entire mobile unit, making it easier for movement across the soil surface.

In use the apparatus is moved over the soil surface, either manually or by power means, and the cavitation effect on the water in the chamber 15 kills any seeds 20 located therein, and the water penetrates the surface of the soil and kills seeds 20 which are located in the top fraction of an inch of the soil's surface, which is the portion of the soil's surface in which most seeds germinate. If the chamber is omitted, the transducer produces the cavitation effect directly in the soil which has previously been saturated with an aqueous medium.

THE INHIBITION OF VEGETATIVE SPROUTING

The sprouting of agricultural and horticultural products may be inhibited by subjecting them to the cavitation effect of ultrasonic sound waves when immersed in an aqueous medium. The meristematic tissue in the eye of a potato or at the origin of growth in an onion or at the wild-stock bud of grafted roses, etc., is inhibited and thus entirely prevented from growing or growth is greatly retarded. In this way, great losses in such food and horticultural products may be eliminated, particularly while in storage.

The sprouting is prevented by subjecting the potatoes, etc., immersed in an aqueous liquid such as pure water or treated water, to the cavitation effect produced by ultrasonic sound waves. The cycle of these sound waves is generally the same as that used to inhibit the germination of weed seeds, from 20,000 to 40,000 cycles. The vibration used to produce the cavitation will depend upon the size of the potatoes, onions or other food product, the content of the aqueous solution, etc.

In the treatment of potatoes, for example, the cavitation effect may be combined with the washing step which most potatoes undergo, or it may be conducted as a separate operation. The potatoes will, for example, roll down a sloping trough in which they are covered or substantially immersed in water or they are brushed or otherwise forced down a level trough, and there may be several transducers on each side of the trough or perhaps above or below it so that all sides of each potato are subjected to the cavitation effect. The cavitation effect will have a more intense cleansing action than the usual water washing and will incidentally remove foreign matter which may include organisms which if not removed will result in deterioration of the potato in storage. Thus the organisms which cause deterioration by bruising of the potato may be removed and the life of the potato prolonged.

Where potatoes are collected for storage or transportation, a trough may be provided which is anywhere from 10 to 20 feet long, more or less, and water will flow through the trough several inches deep. It may cover the potatoes, although this is not necessary. The trough may be operated so as to cause the potatoes to roll along through the trough, either by gravity or mechanical means for propelling them may be used, such as a brush or the like. The trough may have one or more transducer probes exposed therein to produce cavitation in the water. Although there may be but a single source of the cavitation, it will usually be desirable to provide several sources.

The length of the treatment will vary from a few seconds, e.g., 3 seconds to perhaps 10 or 20 seconds, depending upon the frequency of the ultrasonic sound waves, etc. This rate will ordinarily be in the range of 20,000 to 40,000 cycles per second. For a longer dwell in the bath, a lower frequency may be used than where a shorter dwell is provided.

Thus, potatoes submerged in water, exposed to only 5 and 10 second exposures, producing cavitation by vibration of 40,000 cycles showed no signs of sprouting approximately sixty days after exposure. The treatment may, for example, last 3 to 20 seconds. They proved to be in excellent condition. The control potato had sprouted and was shriveling. Potatoes exposed to the cavitation for 30 and 60 seconds were totally rotten after 60 days.

Onions and other such plant products may be similarly treated to prevent sprouting.

For grafted rose bushes and the like, a dipping treatment will be desirable although the roses may be conveyed through a water bath in which the treatment occurs. Usually the roses are carried on a conveyor to the potter and anywhere along its travel route they may be dipped in a bath where they are subjected to cavitation, individually or in bunches. This may be done manually or it may be an automated operation. Manually conducted, it may be carried out by the potter, but as it would be necessary to keep the roses in the bath for a matter of seconds, this might slow his operation, making a separate dipping treatment desirable. The cavitation causes a cleansing of the root area, and removal of soil and organic material which might shorten the life of the roses. The treatment should be limited to the root area so as not to subject the growth area of the bushes to cavitation.

The treatment may consume as much as 3 to 5, 10 or 20 seconds, but normally no longer. The time of treatment will normally be inverse to the rate of ultrasonic vibrations.

A rose bush which has been subjected to such treatment will, after potting, be free of unwanted sprout growth from the understalk.

CYTOPLASMIC MEMBRANE RUPTURE

There are various cellular plant products in which the cells are enclosed in cytoplasmic membranes and ultrasonic cavitation can be generated in water baths containing such plant structures so as to rupture these membranes and kill the plant.

For example, algae are known to pollute various water sources and this pollution is objectionable. Many dollars are spent each year in trying to minimize it. A very simple method of preventing such pollution in cooling systems, swimming pools, fish aquariums, etc., is to recirculate a relatively small stream of the water through a relatively small piece of equipment in which the cavitation is produced continuously or intermittently so that in the course of several hours the whole volume of the water is given a desired treatment. The cycle for such cavitation is 20,000 to 40,000 cycles, as previously disclosed. The cells of algae subjected to such treatment for periods of time from 30 seconds to 90 seconds, depending upon the frequency of the ultrasonic waves, are ruptured, preventing the growth of the algae. The residue of the algae can readily be removed by subsequent filtration, sedimentation, centrifuging or the like.

EXTRACTION OF TEA, COFFEE AND THE LIKE

Cavitation adopts itself well to the extraction of various materials, particularly tea and coffee, as in the manufacture of the so-called instant beverages in which the extract is solidified to be later dissolved in cold water. When the extraction is carried out at an elevated temperature, as is customary, the tannin or tannic acid in the tea or coffee is affected and this alters the taste of the extract, whereas if the extraction were carried out at a lower temperature as, for example, room temperature up to 100° to 125° or 150° F., the temperature would not affect the taste of the extract, and such extraction is possible by cavitation.

The usual procedure is to stir the suspension of the crushed tea leaves or ground coffee beans in the cold or warm water, and then either by immersing a transducer into the water or causing the suspension to flow through apparatus in which the cavitation is produced or otherwise imparting the cavitation effect to the water, the cells in the tea or coffee are ruptured and the extract is obtained without producing undesirable effects which result from heating near the boiling point. The frequency range discussed above for rupturing meristematic tissue, namely, in the range of 20,000 to 40,000 cycles per second for several seconds, e.g., 3 to 90 seconds is satisfactory.

TREATMENT OF POTTED PLANTS

The rate of the frequency cycle can be controlled so as not to affect living plants but merely kill seeds which are present in the soil. This can be done, for example, in potted plants where the seeds are killed by the cavitation effect without interfering with the growth of the plants themselves.

These plants may be of the agricultural type such as onions, tomatoes, etc., which are commonly sold in containers which may hold a single plant or many plants, or they may be horticultural plants, such as roses, petunias, and other horticultural plants commonly sold in containers which hold a single plant or many plants.

The treatment may, for example, consist in first watering the soil in a pot or other container in which a plant or many plants are growing, and then inserting a probe of a transducer into the soil in the container, or a multi-probe into the soil in many pots simultaneously or into the soil in different portions of a large container. A cycle of 20,000 to 40,000 is used, and the treatment is from a few (e.g. three) seconds to 120 or more, depending upon the number of cycles per second. The treatment is controlled so as to inhibit the germination of the weed seeds present without producing any harmful effect whatsoever on the growing plant.

The probe treatment is advantageously applied to the potted plant immediately after watering and preferably while the top of the soil within the container is sufficiently soft to receive the probe easily or the probe may be inserted while there is still water standing on top of the soil. The seed germination normally takes place near the top of the soil and the cavitation effect described will inhibit weed seed germination in such soil even though the probe does not penetrate deep into the container.

Instead of inserting the probe into the container, the containers may be immersed in water and then one or more probes may be used to produce the cavitation effect in the water which is then transmitted through the container walls and inhibits the germination of the weed seeds in the saturated soil within the containers. The pots are made of thin metal or thin plastic or other material which is capable of transmitting ultrasonic vibrations. For this effect the same cycles of, for example, about 20,000 to 40,000 cycles per second, will be desirable.

The range of cycles recommended for the various treatments described in the foregoing is based on present knowledge. On further investigation, a wider or different range may be recommended which, in each instance, may vary from 5,000 or 10,000 cycles to include the presently recommended range of 20,000 to 40,000 cycles up to 50,000 or 75,000 or 100,000 or even 150,000 cycles or more, or a range between any two of the preceding figures. The minimum will be that necessary to produce the desired result and the maximum must be insufficient to harm the plant life which is being treated. The preferred number of cycles may vary with the length of treatment, the temperature of the material treated or the temperature or composition of the bath in which the cavitation is effected.

I claim:

1. The process of inhibiting the germination of unwanted vegetation seeds on or near the surface of a growing medium which medium is saturated with an aqueous medium which comprises subjecting an aqueous body located over the surface of the growing medium with the seeds on or in said medium, to the cavitation effect produced by ultrasonic sound waves of 20,000 to 40,000 cycles per second for 3 to 120 seconds.

2. The process of claim 1 in which the growing medium is a lawn.

3. The process of claim 1 in which the growing medium is a golf green.

4. The process of claim 1 in which the growing medium is a flower bed.

5. The process of claim 1 in which the growing medium is a field in which a horticultural crop is growing.

6. The process of inhibiting the sprouting of potatoes, onions and the understalk of grafted rose plants and the like immersed in an aqueous medium, which comprises subjecting the same to the cavitation effect produced by ultrasonic sound waves of 20,000 to 40,000 cycles per second for 3 to 20 seconds while immersed in an aqueous medium.

7. The process of killing plants by rupturing the cytoplasmic membranes thereof which comprises subjecting the plants immersed in water to the cavitation effect produced by ultrasonic sound waves of 20,000 to 40,000 cycles per second for 3 to 15 seconds.

8. The method of killing seeds in the soil of potted plants which soil is saturated with an aqueous medium, or in such soil on which an aqueous medium is standing which comprises inserting the probe of an ultrasonic transducer into the saturated soil or into the aqueous medium standing on the soil, and producing by the probe in said saturated soil or said aqueous medium standing on the soil, the cavitation effect of ultrasonic sound waves of 20,000 to 40,000 cycles per second for 3 to 120 seconds.

9. The method of killing seeds in the soil of potted plants, which soil is saturated with water, which comprises placing the plant in water, creating ultrasonic sound waves of 20,000 to 40,000 cycles in the water and producing a cavitation effect which is transmitted through the pot walls and thereby kills the seeds.

10. The process of inhibiting the growth of seeds at the surface of a restricted area of the soil which comprises flooding said restricted area and subjecting the flooding medium for 3 to 120 seconds to the cavitation effect produced by ultrasonic sound waves of 20,000 to 40,000 cycles per second, thereby inhibiting the growth of seeds in the flooding medium.

11. The process of inhibiting the germination of seeds of unwanted vegatation near the surface of a growing medium saturated with an aqueous medium which comprises placing means which generates ultrasonic sound waves on a saturated medium containing these seeds and with said means subjecting the seeds to the cavitation effect produced by ultrasonic sound waves of 20,000 to 40,000 cycles per second for 3 to 120 seconds.

12. The process of claim 1 in which the seeds are seeds of rye grass, the cavitation effect is produced by waves of substantially 40,000 cycles per second for a period of 10 to 90 seconds.

* * * * *